No. 607,517. Patented July 19, 1898.
G. W. MESERVE.
PIPE COUPLING AND PATCH.
(Application filed July 6, 1897.)
(No Model.)
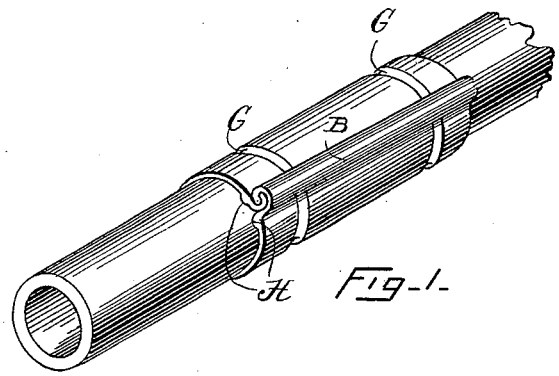
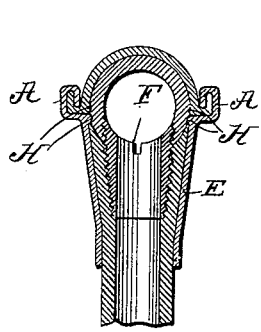
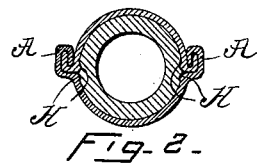
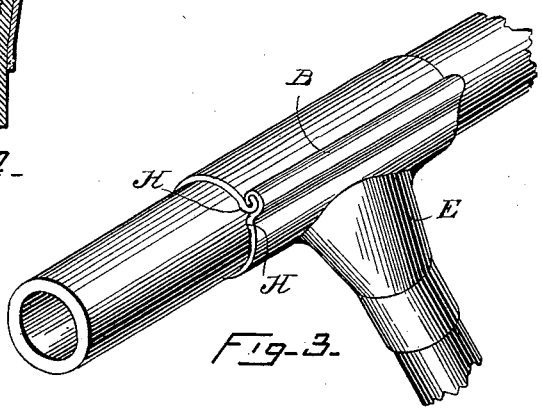
WITNESSES
INVENTOR

UNITED STATES PATENT OFFICE.

GEORGE W. MESERVE, OF BOSTON, MASSACHUSETTS.

PIPE-COUPLING AND PATCH.

SPECIFICATION forming part of Letters Patent No. 607,517, dated July 19, 1898.

Application filed July 6, 1897. Serial No. 643,632. (No model.)

*To all whom it may concern:*

Be it known that I, GEORGE W. MESERVE, a citizen of the United States, and a resident of Boston, in the county of Suffolk and State of Massachusetts, have invented a new and useful Improvement in Pipe-Couplings and Patches, of which the following, taken in connection with the accompanying drawings, is a specification.

My invention relates to improvements in devices for joining and repairing lead pipes commonly used in house-plumbing, closing leaks, connecting pipes endwise, making side branches and the like, patching and coupling rubber hose, securing draw-cocks in position, and general plumbing work, having for its chief object to provide a simple and efficient coupling for pipes which may be applied by unskilled hands without the use of special tools or hot solder.

The advantages of my invention may be fully understood by studying the following description and claims, which I have illustrated by the accompanying drawings, in which like letters refer to like parts in the several views.

Figure 1 is a perspective view in detail illustrating my improved coupling-sleeve in position as applied over a leak in a common water-pipe. Fig. 2 is a cross-section through the center of Fig. 1. Fig. 3 is a perspective view illustrating my improved T-branch coupling-sleeve in position joining the end of one lead pipe to the side of another. Fig. 4 is a cross-sectional view of Fig. 3, showing the connecting lead pipes, the hollow tap-screw depressing the walls of the lead pipe against the inclosing sleeve, and the outline of the sleeve with its side clenching-jaws. Fig. 5 is a plan view of my improved tap-screw made hollow and to conform to the curvature of the outer wall of the connecting-pipe and slotted to receive a screw-driver.

A refers to the diagonal clenching-jaws; B, to the body of the sleeve; E, to the bracing form of the T-branch sleeve; F, to the slots for driving the tap-screw in the pipe; G, to the pressed rings or ornaments surrounding the sleeve; H, to depressions or lobes abutting the joints of the sleeve.

In the manufacture of these goods I prefer to use sheet-steel, galvanized, for the outer portions and brass for the inner parts.

My coupling-sleeve (illustrated in Figs. 1 and 2) is made from two sheets of steel, of equal length and thickness, cut wide enough to inclose the pipe for which they are intended and to form the clenching-jaws, (marked A A.) They are cut longitudinally goring and crushed or drawn into a die of proper shape to fit them to the pipe and clasp them together, so that one end of each piece is somewhat narrower than the other. The two wide ends are united by the grooves or clenching-jaws over the pipe and pushed into each other, thus forming an inverted wedge, drawing closer to the pipe as they are being completely united.

To stop the leak or make a tight joint, the pipe should be covered with a thin layer of leather or rubber, making a soft packing between the two metals. It will be seen that when the inclosing sleeve is properly united around the pipe its diameter at each end will be equal. The lateral joints will run diagonally along the sides of the pipe until the wide ends are engaged by the narrow ends of the sleeve.

To make a T-branch joint, I first drive the coupling-sleeve onto the end of the pipe and shape the pipe to the inner walls of the sleeve, both sidewise and endwise, place a small leather collar between the side of the pipe and inner wall of the sleeve marked E, then turn in the hollow tap-screw, depressing the pipe firmly against the packing and sleeve until the wide end of the tap-screw shall project above the bottom of the sleeve no more than the thickness of the side wall of the pipe to be connected thereto, then drill a hole in the side of the pipe large enough to receive the projecting end of the tap-screw, lay the packing around the pipe, with a hole therein to fit closely to the tap-screw, and when nicely fitted together connect the top member of the sleeve by hammering them firmly together.

The expanded throat of the T-joint sleeve marked E serves a triple purpose: first, to brace the joint connection; secondly, to receive the packing, and, thirdly, to guard against the pipes drawing apart or slipping out of the sleeve.

The slight depressions marked G G, Fig. 1, are intended for ornamentation and to make sure of a couple of rings around the pipe where the sleeve shall fit very closely, especially useful where pipes have been damaged or bruised or beaten into irregular shape. (See also slight inward curvature marked H, Figs. 1, 2, 3, and 4, which may be used for a similar purpose in repairing old pipes.)

It will be seen from the foregoing that the sleeves cut goring can be made to draw very heavily upon the pipe.

What I claim, and desire to secure by Letters Patent, is—

1. A divided coupling-sleeve, composed of sheet metal, each member having one end narrower than the other, and having clenching flanges or jaws on the one part turned outwardly and upwardly, and on the other turned outwardly, upwardly and downwardly, adapted to unite and slide together substantially as and for the purpose set forth.

2. A divided coupling-sleeve, composed of sheet metal, each member having one end narrower than the other, and having clenching flanges or jaws on the one part turned outwardly and upwardly, and on the other turned outwardly, upwardly and downwardly, adapted to unite and slide together, and having a T-branch attachment, in one member of the sleeve, with distended mouth, bracing the joint, substantially as and for the purpose set forth.

3. A T-branch coupling of two pipes, end to side, by means of a hollow tap-screw driven into one end of the pipe, and exposed to receive the side wall of the other, and an inclosing sleeve, having a T-branch attachment in one member of the sleeve, with distended mouth bracing the joint, substantially as and for the purpose set forth.

In testimony whereof I have signed my name to this specification, in the presence of two subscribing witnesses, on this 25th day of June, A. D. 1897.

GEORGE W. MESERVE.

Witnesses:
ANNIE B. HOLWAY,
EDWARD J. JONES.